United States Patent Office

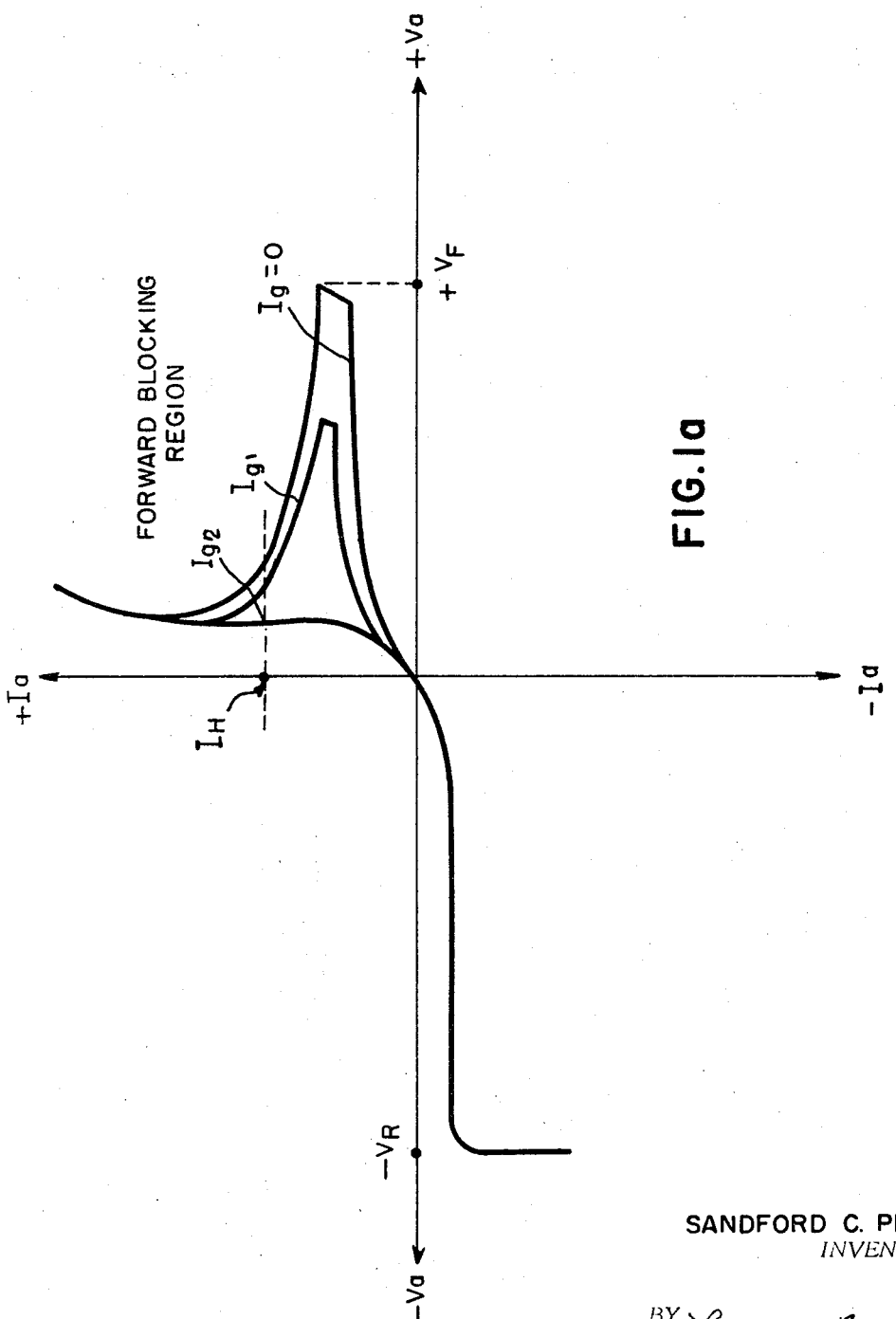

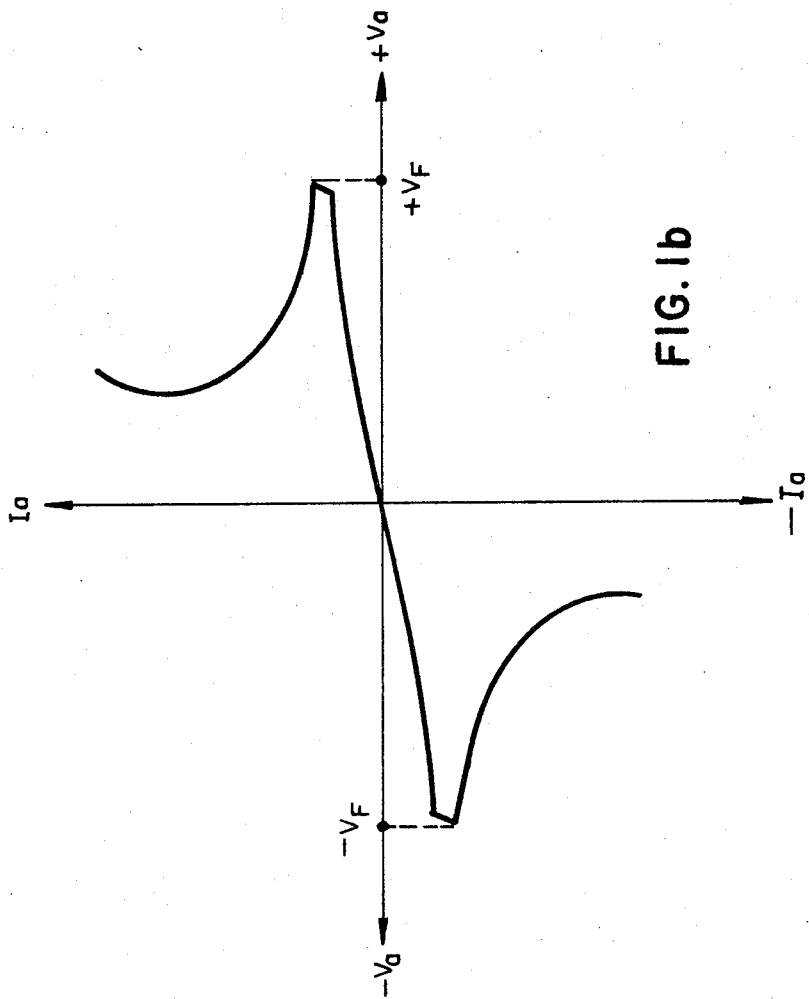

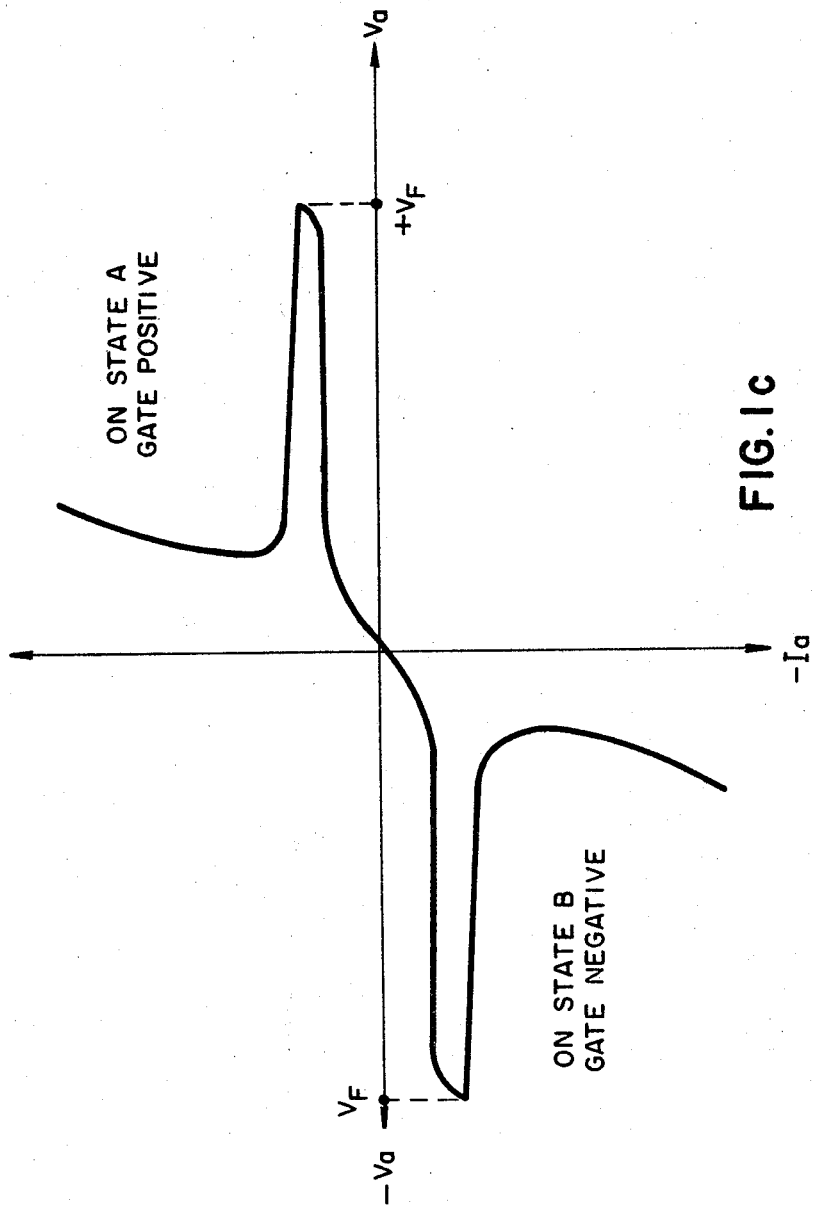

3,428,862
Patented Feb. 18, 1969

3,428,862
A.C. CONTROL CIRCUIT FOR ARC
DISCHARGE LAMPS
Sandford C. Peek, Ipswich, Mass., assignor to Sylvania
Electric Products Inc., a corporation of Delaware
Filed Dec. 30, 1965, Ser. No. 517,542
U.S. Cl. 315—195
Int. Cl. H05b 41/36
13 Claims

ABSTRACT OF THE DISCLOSURE

An alternating current electronic ballast for a pair of arc discharge lamps in which electronic switching devices charge and discharge a condenser, during different parts of the alternating current cycle, whereby a first arc discharge lamp is lighted while the condenser is charging and a second arc discharge lamp is lighted while the condenser is discharging.

---

The present invention relates to circuits for igniting arc discharge devices such as fluorescent lamps and high pressure discharge lamps.

In conventional circuits for igniting arc discharge devices, electrical power is supplied to the device through a circuit including a reactive impedance connected in series with the device. Such impedances are known as ballasts and may be inductive or capacitive. The electrical power supplied to the lamp is converted by it to visible light.

In general, an inductive ballast regulates the current flowing through the discharge device, thereby preventing arc-current run-away or the extinguishing of the arc as a result of normal fluctuations in the supply of electrical power.

However, inductive ballasts are expensive to manufacture, occupy a large amount of space in lamp fixtures and dissipate large amounts of electric power.

It is, therefore, an object of the present invention to provide a circuit for igniting arc discharge devices that uses electron devices, or devices in which conduction is principally by electrons moving through a vacuum, gas or semiconductor, instead of conventional ballasts.

In accordance with the invention, a circuit for igniting arc discharge devices comprises an energy source means, at least one arc discharge device, energy storage means and an electron device means which effects ignition of the arc discharge device by periodically coupling energy from the source to the discharge device and energy storage means.

Many objects, features and advantages of this invention become manifest to those conversant with the art, upon making reference to the following detailed description of several embodiments of the invention taken with reference to the drawings, of which:

FIGURES 1a, 1b, 1c are graphs of voltage-current characteristics of an electron device.

Prefatory to a detailed description of the invention, the operation of a conventional electron device known as the silicon controlled rectifier (SCR) is briefly reviewed.

An SCR is a p-n-p-n semi-conductor switch whose bistable action depends on regenerative internal feedback.

FIGURE 1a shows the voltage-current (V-I) characteristic of a typical SCR. The forward blocking region of the typical SCR is shown for several values of gate current, $I_g$. As gate current increases, the current through the SCR, $I_a$, increases. As the voltage, $V_a$, across the SCR increases in the positive direction, for a given gate current, an avalanche multiplication of holes and electrons begins to occur. When the internal loop gain of the SCR exceeds units, the SCR switches into its high conduction state and remains there so long as the current $I_a$, exceeds the holding current, $I_H$, value. The voltage, $V_F$, is the forward breakover voltage of the SCR, that is, the voltage at which the SCR switches into its highly conductive or avalanche state.

Next, in the reverse direction, the SCR operates like two reverse-biased P-N junction diodes connected in series. Thus, like a reverse-biased diode, the SCR exhibits a reverse-voltage breakdown at some voltage, $-V_R$.

FIGURE 1b shows the V-I characteristic of the SCR known as a bilateral trigger diode (DIAC). The DIAC is not gated but exhibits a bilateral avalanche characteristic or regenerative internal feedback which occurs for either polarity of voltage applied across the DIAC. Such a characteristic can be obtained by connecting two SCR's of the type shown in FIGURE 1a, in inverse parallel connection and either setting the gate currents equal to zero or opening-circuiting the gate input terminals.

FIGURE 1c shows the V-I characteristic of the SCR known as a bi-directional gate-controlled triode switch (TRIAC). The TRIAC is usually gate-triggered into its avalanche states by either polarity of gate input. Such a characteristic can be obtained by connecting two SCR's of the type shown in FIGURE 1a, in inverse parallel connection and is distinguished in operation from the DIAC by virtue of its gated switching characteristic.

In general, an SCR is switched from its avalanche or conducting state to its forward blocking or low conduction state when the SCR currents drops below $I_H$, when the voltage across the SCR is zero (that is, the SCR is short-circuited) or when more current in the reverse direction is forced through the SCR than is trying to flow in the forward direction.

Figure 2:
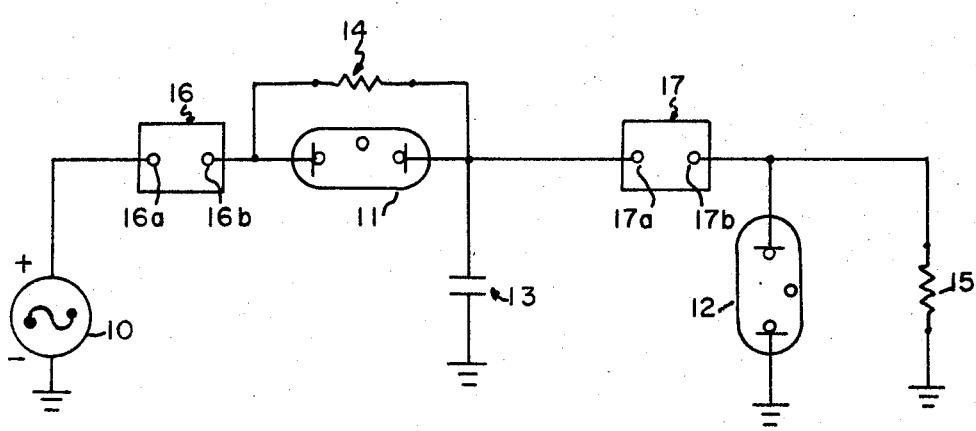
FIGURE 2 is a circuit for activating arc discharge devices, constructed in accordance with the present invention and shown in block-diagram and schematic form.

Referring now to FIGURE 2, there is shown a circuit for activating arc discharge devices. The circuit comprises an energy source means 10 which may be an A-C source voltage, $$s = E_s \sin 2\ ft$$

The circuit includes first and second arc discharge devices, for example, fluorescent lamps 11, 12 which are shunted by small impedances such as for example resistors 14, 15. The circuit also includes an energy storage means, for example capacitor 13. Lastly, the circuit includes a first electron device means 16 for periodically coupling energy from the source 10 to the series circuit comprising the first lamp 11 and the capacitor 13; and a second electron device means 17, connected in series with the second lamp 12, for periodically coupling energy stored in the capacitor 13 to the lamp 12. The periodic coupling of energy to the lamps 11, 12 by the electron device means 16, 17 ignites the lamps. Impedances 14, 15 are incorporated in the circuit to aid in starting the lamps.

Electron device means 16, 17 have input terminals 16a, 17a and output terminals 16b, 17b respectively. FIGURES 3a, 3b, 5a, 5b show preferred embodiments of electron device means 16, 17.

Figures 3A, 3B:
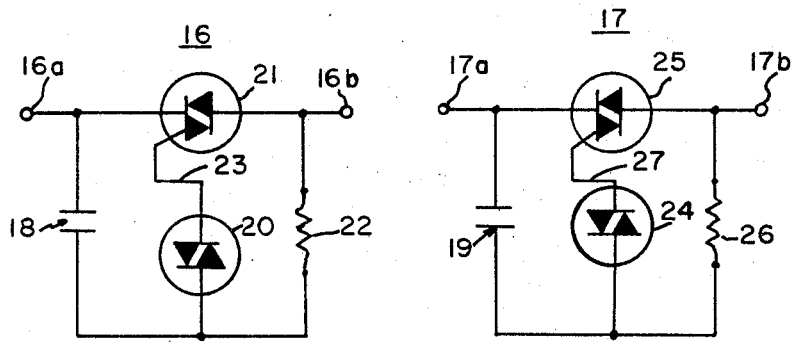
FIGURES 3a, 3b are one form of electron device means incorporated in the circuit shown in FIGURE 2.
Figure 4:
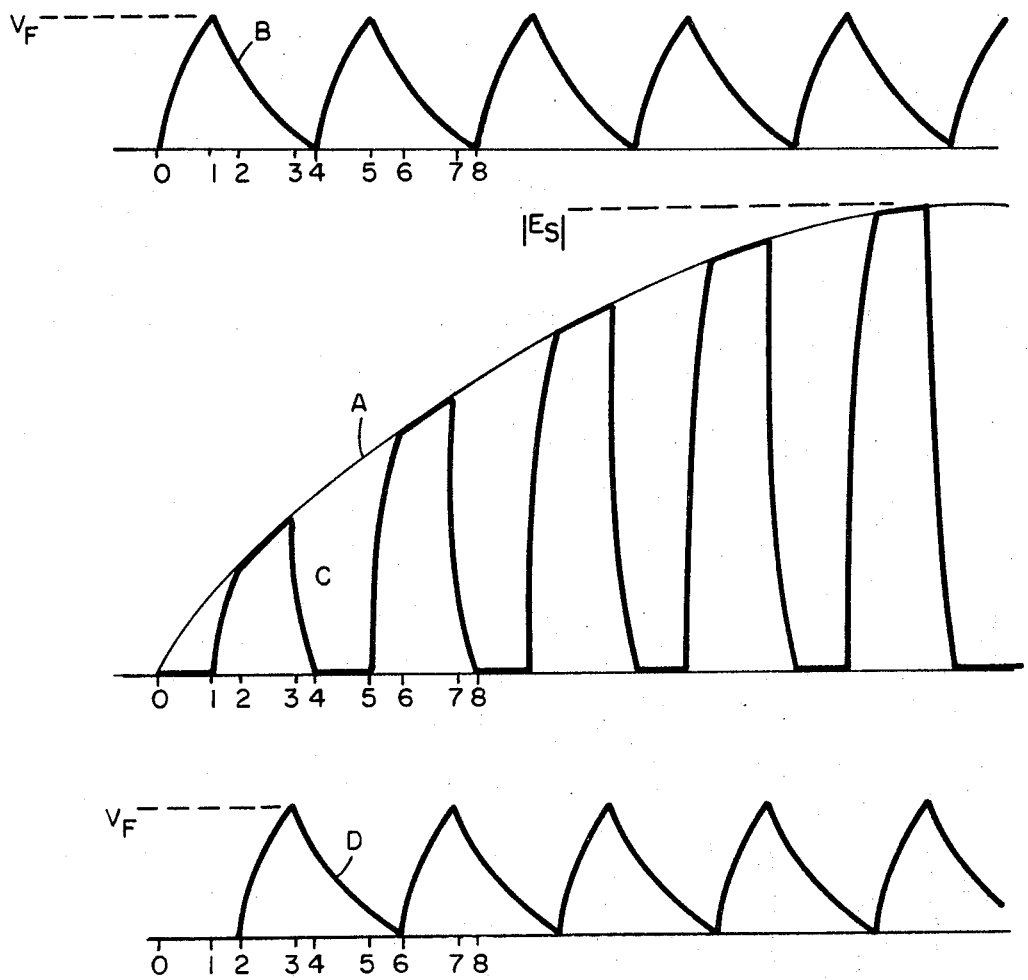
FIGURE 4 shows voltage waveforms, simplified for purposes of description, useful to explain the operation of FIGURES 2, 3a and 3b.

First, incorporating the embodiments of FIGURES 3a, 3b in FIGURE 2 and making reference where appropriate to the waveforms in FIGURE 4, assume that, at time $t_0 = 0$, there are no charges stored on capacitors 13, 18, 19 and no currents flowing in lamps 11, 12. Waveform A represents the source 10 voltage, $e_s$, which during the period $t_0$ to $t_1$ is applied across device means 16 terminals 16a, 16b. Device means 16 comprises a first semiconductor electron device, such as for example DIAC 20, and a second semiconductor electron device, such as for example TRIAC 21. Device means 16 also includes means intercoupling the DIAC and TRIAC, such as for example capacitor 18, resistor 22 and conductor 23, which intercoupling means act to switch the electron devices from essentially nonconductive or forward blocking to conductive or avalanche states.

In particular during the time interval $t_0$ to $t_1$ a voltage, waveform B, is built up across the capacitor 18. This capacitor voltage initially appears across DIAC 20 and at time $t_1$, reaches the forward breakover voltage value $V_F$, for the DIAC 20. The DIAC 20 is then switched into its avalanche state and gates the TRIAC 21 so that it also is switched into an avalanche state; and consequently the voltage source 10 is coupled through the TRIAC 20 to the series circuit comprising lamp 11 and capacitor 13. During the time interval $t_1$ to $t_2$, arc current flows through lamp 11, igniting it; and a charge is built up on capacitor 13 (voltage waveform C). At time $t_2$, the capacitor 13 is charged up to the source voltage magnitude at that instant. Consequently, the arc current is extinguished and the voltage drop across the TRIAC 21 is the capacitor 18 discharge voltage (waveform B).

Second electron device means 17 shown in FIGURE 3b is identical in form to the circuit in FIGURE 3a. During the time interval $t_2$ to $t_3$, capacitor 19 is charged up (waveform D) to the voltage, $V_F$, which is the forward breakover voltage of DIAC 24. DIAC 24 is coupled to TRIAC 25 through conductor 27. Consequently, at time, $t_3$, both DIAC 24 and TRIAC 25 avalanche; and capacitor 13 is thereby coupled through the heavily conducting TRIAC 25 to the second lamp 12 which is ignited by the current discharge from capacitor 13 during the time interval $t_3$ to $t_4$.

Moreover, at time, $t_4$, capacitor 18 has completely discharged through the resistor 22 so that the voltage drop across TRIAC 21 is zero volts. Then, during the interval, $t_4$ to $t_5$, the capacitor 18 is again charged up to a voltage $V_F$. At time, $t_5$, DIAC 20 again avalanches and gates TRIAC 21. The voltage source 10 is again coupled across lamp 11 and capacitor 13. The lamp 11 is ignited for the interval $t_5$ to $t_6$ and at time $t_6$ capacitor 13 is charged to the magnitude of $e_s$ at that instant. At time $t_6$, capacitor 19 starts to recharge initiating at a periodic rate the discharge of capacitor 13 through lamp 12 and consequent ignition of that lamp for the discharge period $t_7$ to $t_8$.

The periodic coupling of energy from source 10 to lamp 11 and capacitor 13 and thence to lamp 12 is shown in FIGURE 4, waveforms A and C, for one-quarter of the source voltage period, at a rate of 20 times the source 10 frequency, $f$. This energy coupling rate is determined by the resistance-capacitance parameters 13, 18, 19, 22, 26 used and limited by the switching speeds of SCR's 20, 21, 24, 25. When the source 10 voltage goes through its negative-going half-cycle, the circuit operation is the same but waveforms B, C and D are also negative-going.

In one embodiment of FIGURE 2, constructed and successfully operated the following components were used:

| | |
|---|---|
| Capacitors 18, 19 | 0.033 microfarads. |
| Resistors 22, 26 | 33,000 ohms. |
| Capacitors 13 | 0.3 microfarad. |
| SCR 21, 25 | SC-41-D. |
| SCR 20, 24 | SP-2. |
| Resistors 14, 15 | 1000 ohms. |
| $e_s$ | $120\sqrt{2} \sin 377\ t$. |
| Lamps 11, 12 | 8 watt fluorescent lamps. |

In lamp igniting circuits constructed in accordance with the present invention electron device means 16, 17 are used in place of conventional ballasts. Lamp curent regulation is effected in this circuit because the energy delivered to lamp 11 and capacitor 13 by the source 10 is limited by the capacitance value and because the source 10 is disconnected from this series circuit after the capacitor 13 is fully charged. As a result, the energy delivered to each lamp 11, 12 is of the order of magnitude $$\frac{C_{13}(e_s)^2}{2}$$

where $/e_s/$ is the value of voltage to which capacitor 13 is fully charged during a typical avalanche period of device means 16, for example, the time interval, $t_1$ to $t_2$.

Figure 5A:
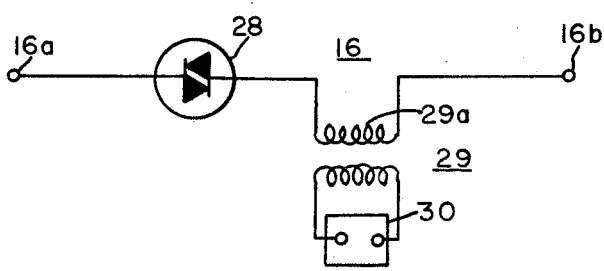
FIGURES 5a, 5b show another form of electron device means which can be incorporated in the circuit shown in FIGURE 2.
Figure 5B:
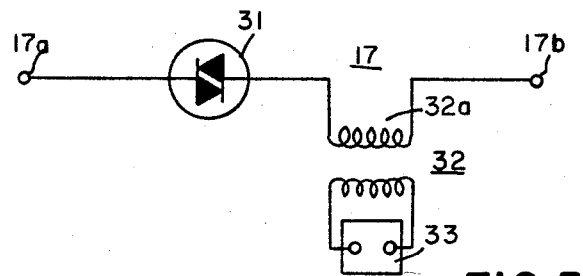

In another embodiment of the FIGURE 2 circuit, constructed in acordance with the invention, the device means 16, 17 of FIGURES 5a, 5b are incorporated in FIGURE 2. Here, a first electron device means 16 for periodically coupling energy from the source 10 to the lamp 11 and capacitor 13 includes a non-gated bilateral SCR 28, a pulse transformer 29 and a pulse generator 30. A second electron device means 17 for periodically coupling energy from the capacitor 13 to the second lamp 12 also includes a non-gated bilateral SCR 31, a pulse transformer 32 and a pulse generator 33. If pulse generators 30, 33 are adjusted to have periodic rates equal to 20 times the source 10 frequency, $f$, and have outputs suitably delayed with respect to each other, then the operation of FIGURE 2 circuit is analogous to that circuit's operation described above. Pulses coupled to the transformer secondaries 29a, 32a, periodically switch the SCR's 28, 31 from forward blocking to avalanche states and back to forward blocking. Consequently, lamps 11, 12 are periodically ignited in the manner described above.

While there is shown and described herein, certain specific structure embodying the invention, it will be manifest to those skilled in the art that various modifications and rearrangements of parts may be made without departing from the spirit and scope of the underlying inventive concept and further that this concept is not limited to the particular forms herein shown and described, except insofar as indicated by the appended claims.

What I claim is:
1. A circuit for igniting and operating electric arc discharge lamps comprising:
   (a) alternating current electric energy source means as the only energy source;
   (b) first and second arc discharge lamps;
   (c) electric energy storage means connected to said source means through said first electric discharge lamp; and
   (d) electron device means for periodically disconnecting and connecting said energy storage means to said energy source means and for connecting said second electric discharge lamp to said energy storage means substantially only while the latter is disconnected from said energy source means.
2. A circuit for igniting and operating electric arc discharge lamps comprising:
   (a) alternating current electric energy source means as the only energy source;
   (b) first and second arc discharge lamps;
   (c) electric energy storage means connected to said source means through the first of said lamps; and
   (d) first electron device means for periodically connecting and disconnecting said energy storage means from said energy source means; and
   (e) second electron device means for periodically connecting and disconnecting said energy storage means from said energy source means and for connecting said second electric discharge lamp to said energy storage means while the latter is disconnected from said energy source means.
3. The circuit according to claim 2 in which said second electron device means is operative in response to the periodic operation of said first electron device means.
4. The circuit according to claim 2 in which said first electron device means comprises: first and second semiconductor electron devices; and means, intercoupling said devices and responsive to said energy source means, for periodically switching said devices from nonconducting to conducting states.

5. The circuit according to claim 4 in which said first electron device is a bilateral trigger diode and in which said second electron device is a bidirectional gate-controlled triode switch, said second device, periodically operative in response to said first device, for coupling said energy source means to said first arc discharge lamp and said storage means.

6. The circuit according to claim 5 in which said first discharge lamp and said storage means are coupled in series connection and in which said second electron device means and said second discharge lamp are coupled in series connection, said latter connection shunting said storage means.

7. The circuit according to claim 6 in which said discharge lamps are fluorescent lamps and said storage means is a capacitance, whose value limits the magnitude of energy coupled to said lamps.

8. The circuit according to claim 4 in which said second electron device means comprises: first and second semiconductor electron devices; and means, intercoupling said devices and responsive to energy stored in said storage means, for periodically switching said electron devices from non-conducting to conducting states.

9. The circuit according to claim 8 in which said first electron device in said second device means is a bilateral trigger diode and in which said second electron device in said second device means is a bidirectional gate-controlled triode switch, said triode switch, periodically operative in response to said trgger diode, for coupling energy stored in said storage means to said second arc discharge lamp.

10. The circuit according to claim 9 in which said first discharge lamp and said storage means are coupled in series connection and in which said second electron device means and said second discharge lamp are coupled in series connection, said latter connection shunting said storage means.

11. The circuit according to claim 10 in which said discharge lamps are fluorescent lamps and in which said storage means is a capacitance, whose value limits the magnitude of energy coupled to said lamps.

12. An electric discharge lamp circuit for connection to an alternating current power line, comprising a first electronic switch, a first electric discharge lamp and a condenser all connected in series, and in shunt to said condenser a second electronic switch and a second electric discharge lamp in series with each other, said first electronic switch being arranged to allow the condenser to charge through said first discharge lamp, thereby lighting the same, and said second electronic switch being arranged to allow the condenser to discharge through said second discharge lamp to cause it to light.

13. A circuit for operating electric discharge lamps from an alternating current power line, said circuit comprising a condenser, a first electric discharge lamp in series with said condenser thereby to be lighted while the condenser is charging, and a second electric discharge lamp connected across said condenser thereby to be lighted while the condenser is discharging, and electronic switching means for connecting said first discharge lamp and condenser in series to an alternating current power line during part only of the alternating current cycle, to charge the condenser, and to connect the second discharge lamp across the condenser to discharge the latter only during another part of the alternating current cycle of the power line.

References Cited

UNITED STATES PATENTS

| 2,252,474 | 8/1941 | Spanner | 315—188 X |
| 2,953,721 | 9/1960 | Chauvineau | 315—241 |
| 3,162,772 | 12/1964 | Smith | 307—88.5 |
| 3,310,687 | 3/1967 | Howell | 315—194 X |

OTHER REFERENCES

Howell, E. K.: "Triac Control for AC Power," appearing in G.E. Application Note; May, 1964. Pages 4 and 5.

JAMES W. LAWRENCE, *Primary Examiner.*

P. C. DEMEO, *Assistant Examiner.*

U.S. Cl. X.R.

307—305; 315—228, 240